United States Patent
Knowles et al.

(10) Patent No.: US 8,667,207 B2
(45) Date of Patent: Mar. 4, 2014

(54) DYNAMIC REALLOCATION OF PHYSICAL MEMORY RESPONSIVE TO VIRTUAL MACHINE EVENTS

(75) Inventors: Jonathan Knowles, Cambourne (GB); David Scott, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 211 days.

(21) Appl. No.: 12/895,750

(22) Filed: Sep. 30, 2010

(65) Prior Publication Data

US 2011/0138147 A1    Jun. 9, 2011

Related U.S. Application Data

(60) Provisional application No. 61/247,555, filed on Sep. 30, 2009.

(51) Int. Cl.
*G06F 12/08* (2006.01)

(52) U.S. Cl.
USPC ............................. 711/6; 711/170; 711/173

(58) Field of Classification Search
USPC .............................................. 711/6, 170, 173
See application file for complete search history.

(56) References Cited

U.S. PATENT DOCUMENTS

| | | | |
|---|---|---|---|
| 7,047,382 B2 * | 5/2006 | Geiger et al. | 711/165 |
| 7,143,413 B2 * | 11/2006 | McCarthy et al. | 718/104 |
| 7,266,649 B2 * | 9/2007 | Yoshida et al. | 711/153 |
| 7,433,951 B1 * | 10/2008 | Waldspurger | 709/226 |
| 7,475,214 B2 * | 1/2009 | Hwang | 711/170 |
| 7,996,846 B2 * | 8/2011 | McCarthy et al. | 718/104 |
| 8,145,763 B2 * | 3/2012 | Waldspurger | 709/226 |
| 8,156,492 B2 * | 4/2012 | Dahlstedt | 718/1 |
| 2002/0099901 A1 * | 7/2002 | Tanaka et al. | 711/6 |
| 2007/0162683 A1 * | 7/2007 | Hattori et al. | 711/6 |
| 2008/0082778 A1 * | 4/2008 | Inoue et al. | 711/170 |

OTHER PUBLICATIONS

Rosenblum et al. Virtual machine monitors: current technology and future trends. May 2005. Computer. vol. 38, No. 5, pp. 39-47.*
Carl A. Waldspurger. 2002. Memory resource management in VMware ESX server. SIGOPS Oper. Syst. Rev. 36, SI (Dec. 2002), 181-194.*

(Continued)

*Primary Examiner* — Sanjiv Shah
*Assistant Examiner* — Samuel Dillon
(74) *Attorney, Agent, or Firm* — Foley and Lardner LLP; John D. Lanza

(57) ABSTRACT

Described are methods and systems for dynamically reallocating memory amongst virtual machines executing within a virtualization environment. A computer can execute a virtualization environment that can include one or more virtual machines and that can include a memory manager. The memory manager can dynamically reallocate memory by identifying a maximum and minimum memory value for each virtual machine, determining a target memory value for each virtual machine using the maximum and minimum memory value, and identifying one or more virtual machines that have an actual memory usage value that is less than the target memory value calculated for those virtual machines. To reallocate the memory, the memory manager can allocate additional memory to the identified virtual machines by inflating a balloon driver, then de-allocate the additional memory, and reallocate the de-allocated, additional memory to other virtual machines within the virtualization environment.

24 Claims, 8 Drawing Sheets

(56) References Cited

OTHER PUBLICATIONS

Hines, Michael R., and Kartik Gopalan. "Post-copy based live virtual machine migration using adaptive pre-paging and dynamic self-ballooning." Proceedings of the 2009 ACM SIGPLAN/SIGOPS international conference on Virtual execution environments. ACM, 2009.*

Lagar-Cavilla, Horacio Andrés, et al. "SnowFlock: rapid virtual machine cloning for cloud computing." Proceedings of the 4th ACM European conference on Computer systems. ACM, 2009.*

Menon, Aravind, et al. "Diagnosing performance overheads in the xen virtual machine environment." Proceedings of the 1st ACM/USENIX international conference on Virtual execution environments. ACM, 2005.*

LeVasseur, Joshua, et al. "Unmodified Device Driver Reuse and Improved System Dependability via Virtual Machines." OSDI. vol. 4. No. 19. 2004.*

Haikun Liu et al: "Optimize Performance of Virtual Machine Checkpointing via Memory Exclusion", CHINAGRID Annual Conference, 2009. CHINAGRID '09. Fourth, IEEE, Piscataway, NJ, USA, Aug. 21, 2009, pp. 199-204, XP031564198, ISBN: 978-0-7695-3818-1. p. 201, left-hand column, line 10 right-hand column, line 16; figure 1.

International Preliminary Report on Patentability on PCT/US2010/051010 dated Apr. 12, 2012.

International Search Report on PCT/US2010/051010 dated Feb. 4, 2011.

Jin Heo et al: "Memory overbooking and dynamic control of Xen virtual machines in consolidated environments", Integrated network Manangement, 2009. IM'09. IFIP/IEEE International Symposiium on, IEEE, Piscataway, NJ, USA, Jun. 1, 2009;, pp. 630-367, XP031499159, ISBN: 978-14244-3486-2.

Weiming Zhao et al: "Dynamic Memory Balancing for Virtual Machines", VEE'09: Proceedings of the 2009 ACM/SIGPLAN/SIGOPS International Conference on Virtual Execution.Environments; Washington, DC, USA; March 11-13, 2009, ACM Press, US, Mar. 11, 2009, pp. 21-30, XP007911487, ISBN: 978-1-60558-375-4 p. 39, left-hand column, line 41 right- hand column, line 5; figure 2 p. 41, left-hand column, line 46 right-hand column, line 29.

Written Opinion on PCT/US2010/051010 dated Feb. 4, 2011.

* cited by examiner

DYNAMIC REALLOCATION OF PHYSICAL MEMORY RESPONSIVE TO VIRTUAL MACHINE EVENTS

RELATED APPLICATIONS

This U.S. patent application claims priority to U.S. Provisional Patent Application Ser. No. 61/247,555, filed on Sep. 30, 2009, the disclosure of which is considered part of the disclosure of this application and is herein incorporated by reference in its entirety.

FIELD OF THE DISCLOSURE

The present disclosure describes methods and systems for managing memory in a virtual machine. In particular, this disclosure describes methods and systems for dynamically managing memory to reduce the memory footprint of a virtual machine.

BACKGROUND OF THE DISCLOSURE

In many virtualization environments, the re-balancing of memory resources can be necessary to ensure that memory resources are efficiently and appropriately utilized. Further, re-balancing memory resources within a virtualization environment and amongst multiple virtual machines can ensure that each virtual machine in the virtualization environment has a minimum memory footprint. Many systems accomplish the re-balancing or redistribution of memory resources by compressing portions of memory or otherwise reducing the amount of memory within a particular virtual machine. In many instances adjusting the memory footprint, or the amount of memory assigned to a particular virtual machine, requires rebooting that virtual machine.

Re-balancing memory in a virtualization environment is one way that a control virtual machine conserves memory resources. Memory reallocation or re-balancing can require re-balancing the memory partitions of a physical disk which, as previously mentioned can require rebooting a virtual machine. The process of having to reboot a virtual machine each time a control virtual machine needs to re-balance memory resources can be inefficient and may limit when and how often a control virtual machine can re-balance the memory resources available in a virtualization environment. Thus, there exists a need for methods and systems for managing the amount of memory allocated to each virtual machine that does not require rebooting each virtual machine.

SUMMARY OF THE DISCLOSURE

In some instances, described herein are methods and systems for re-balancing memory partitions within a virtualization environment using balloon drivers and without requiring a virtual machine reboot. A memory manager executing within a control virtual machine of the virtualization environment, can inflate balloon drivers within virtual machines or domains to cause the allocation of additional memory to those virtual machines or domains. The memory manager can then track the memory locations of the additional memory, and upon deflating the balloon drivers, can reallocate the memory locations of the additional memory to virtual machines needing additional memory.

In one aspect, described herein are methods and systems for dynamically reallocating memory amongst virtual machines executing within a virtualization environment. The virtualization environment, in some embodiments, can execute on a computer and can include one or more virtual machines. The virtual machines can execute on the computer within the context of the virtualization environment. A memory manager executing on the computer within the context of the virtualization environment, can identify a maximum memory value and a minimum memory value for each virtual machine of the virtualization environment. Using the identified maximum and minimum memory values, the memory manager can determine a target memory value for each virtual machine of the virtualization environment. The memory manager can then identify at least one virtual machine that has an actual memory usage value less than the target memory value for the at least one virtual machine. In response to identifying the at least one virtual machine, the memory manager can allocate additional memory to the at least one virtual machine by inflating a balloon driver. Upon allocating the additional memory, the memory manager can de-allocate the additional memory from the at least one virtual machine by deflating the balloon driver. In response to de-allocating the additional memory, the memory manager can then reallocate the de-allocated memory to another virtual machine in the virtualization environment.

In some embodiments, the maximum and minimum memory values are maximum and minimum physical memory values. In other embodiments, the maximum and minimum memory values are maximum and minimum dynamic physical memory values.

The target memory values, in some embodiments, can be calculated using the maximum memory values, the minimum memory values and a host compression ratio.

In one embodiment, the memory manager can allocate the additional memory to the identified at least one virtual machine until the actual memory usage value of the at least one virtual machine substantially equals the target memory value for the at least one virtual machine. In some instances, the memory manager can de-allocate the additional memory upon determining that the actual memory usage value of the at least one virtual machine substantially equals the target memory value for the at least one virtual machine.

In other embodiments, the memory manager enumerates the memory locations of the de-allocated memory in response to de-allocating the additional memory. The memory manager can then reallocate the enumerated memory locations to another virtual machine within the virtualization environment.

In some embodiments, the memory manager can identify a second virtual machine that has an actual memory usage value greater than the target memory value for the second virtual machine. In those embodiments, the memory manager can reclaim an amount of memory from the second virtual machine and reallocate the reclaimed memory to another virtual machine executing within the virtualization environment.

The memory manager, in some embodiments, can identify the maximum and minimum memory values in response to detecting a virtual machine event. A virtual machine event can be any one of a virtual machine reboot, a virtual machine start, and a dynamic constraint modification.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
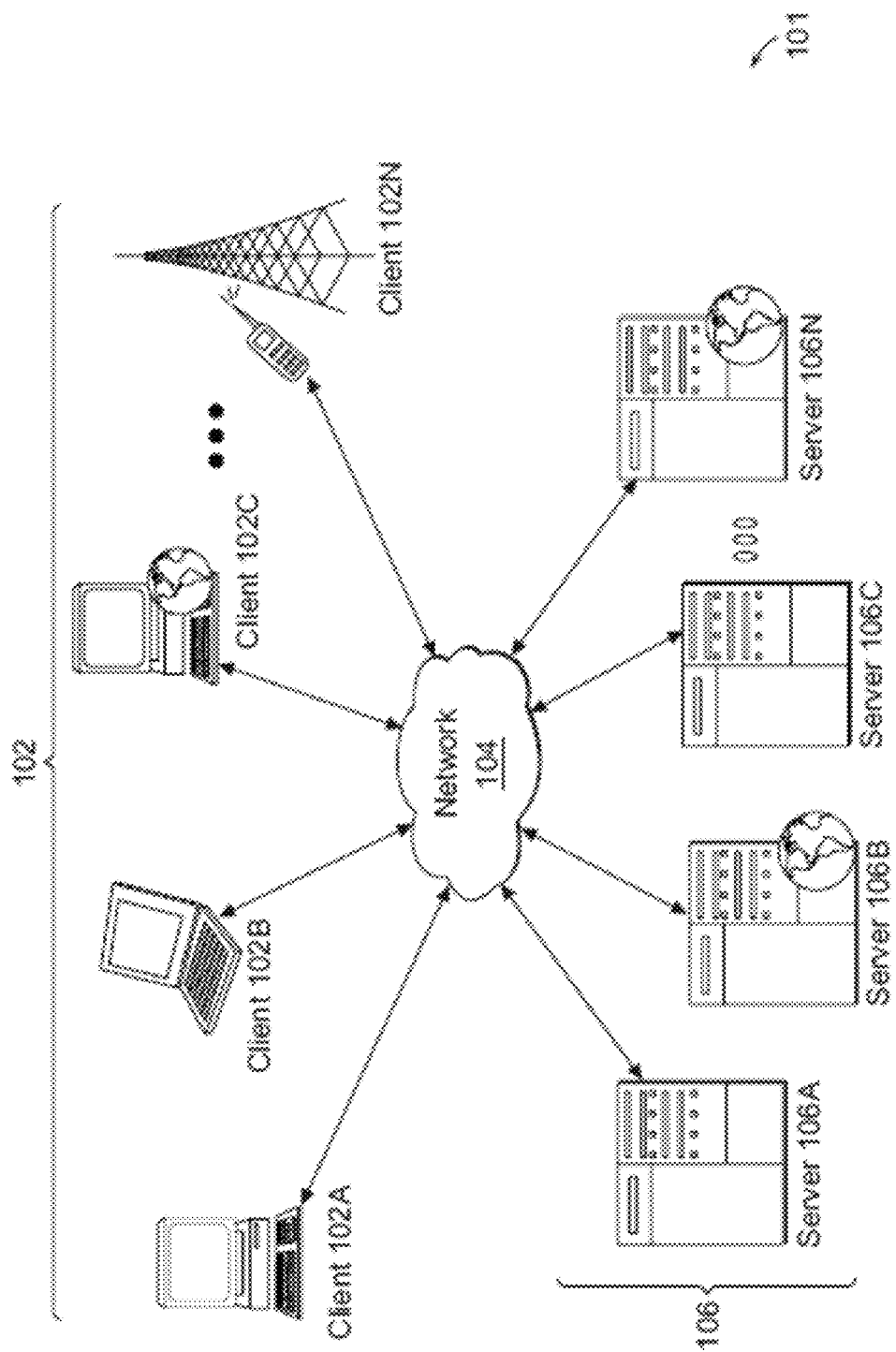
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
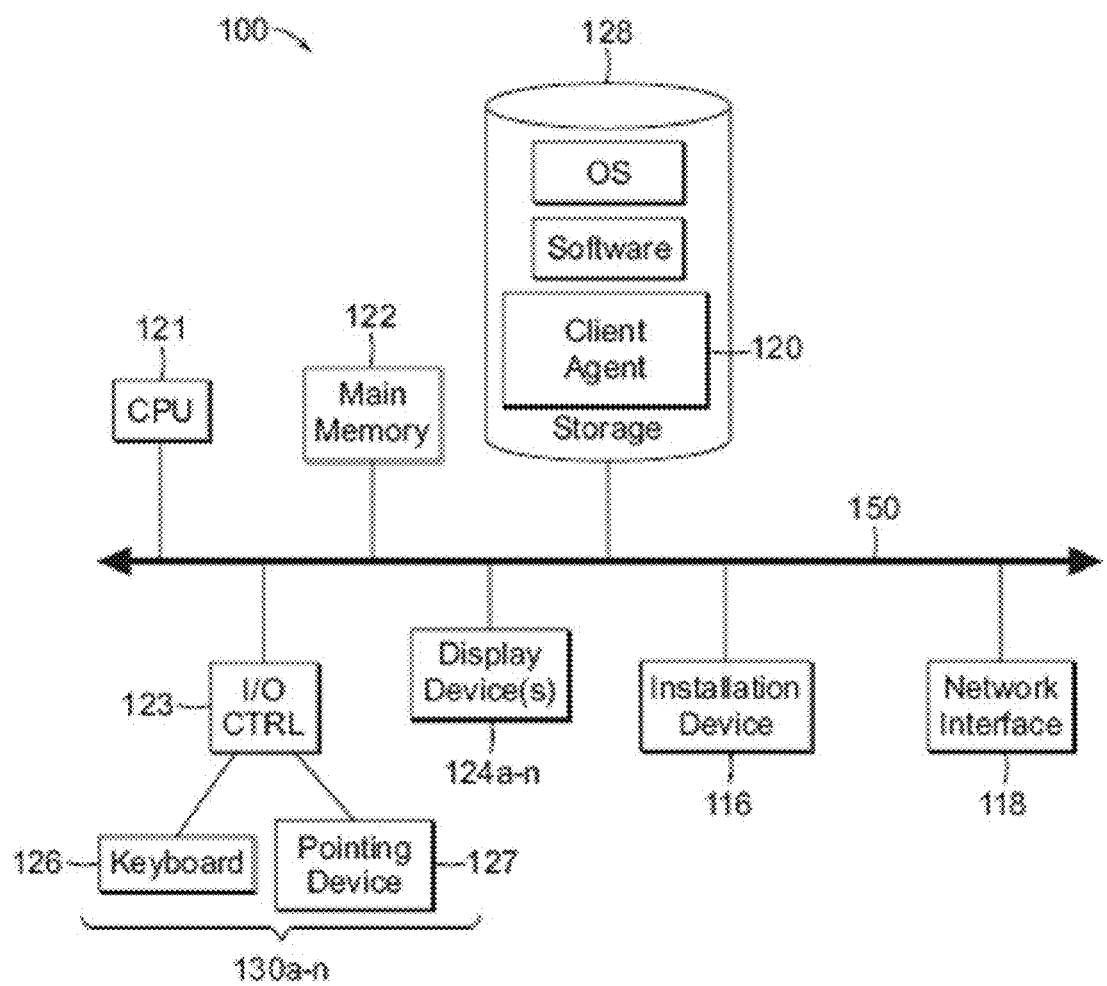
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
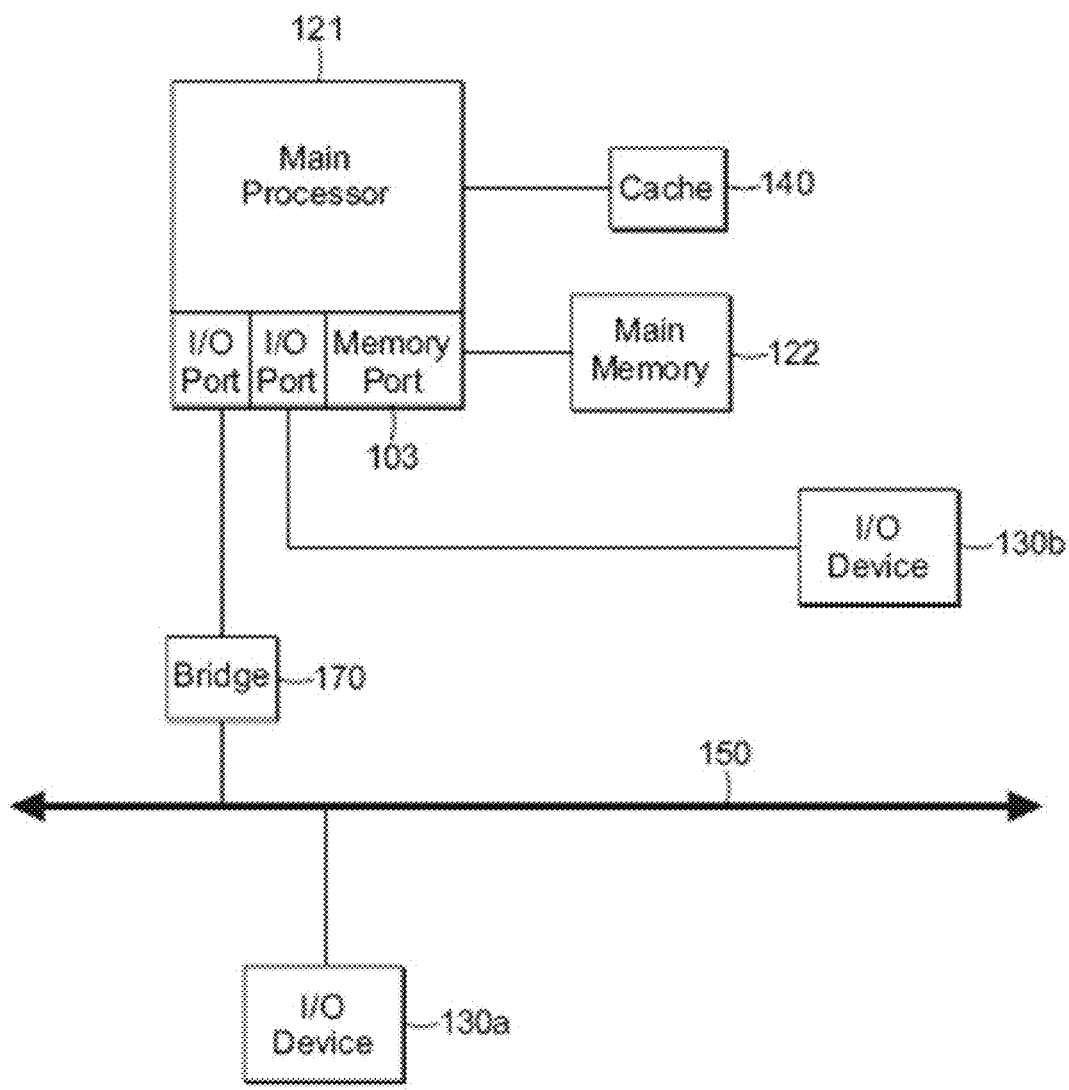

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
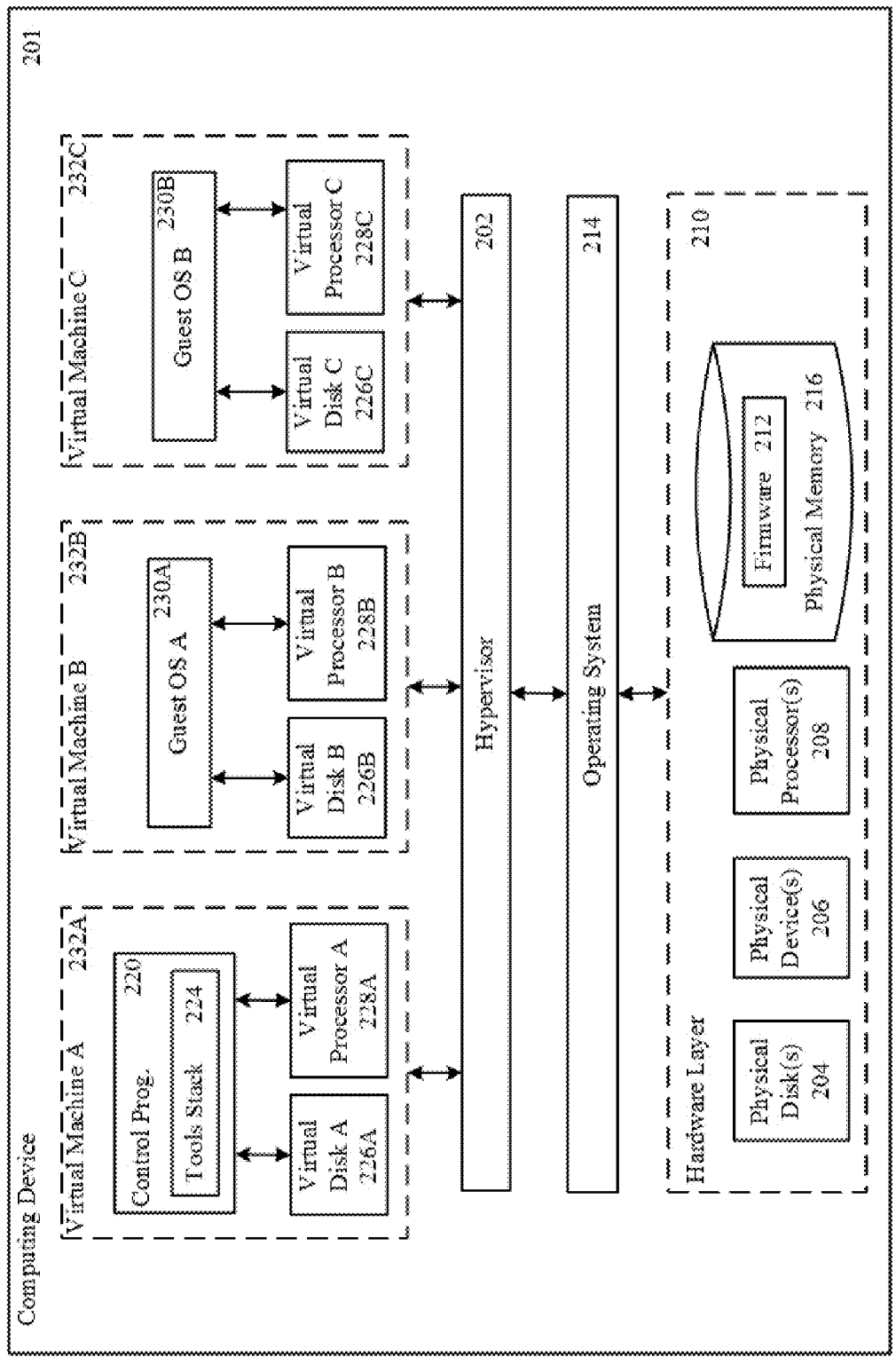
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
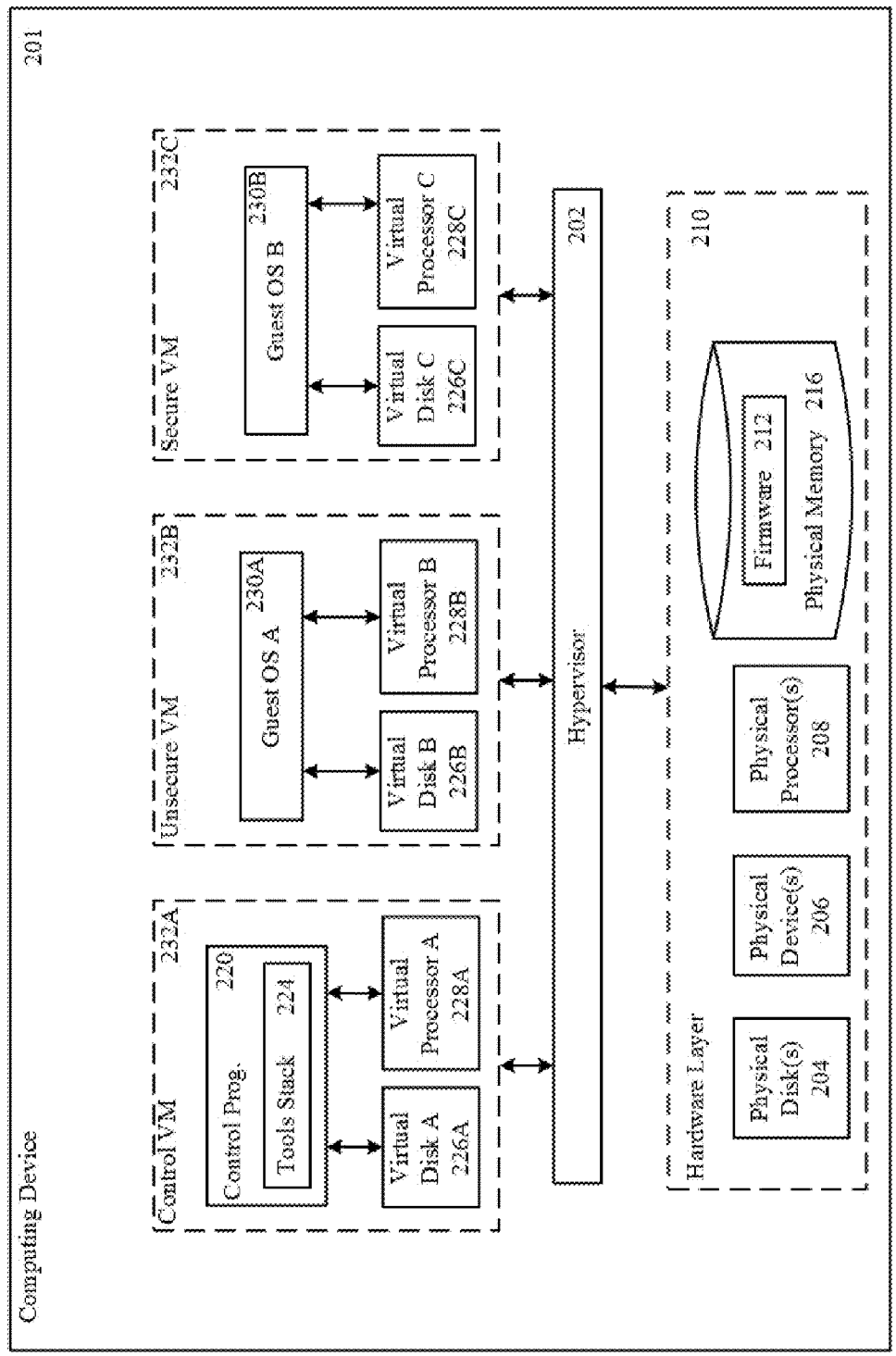

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Figure 3A:
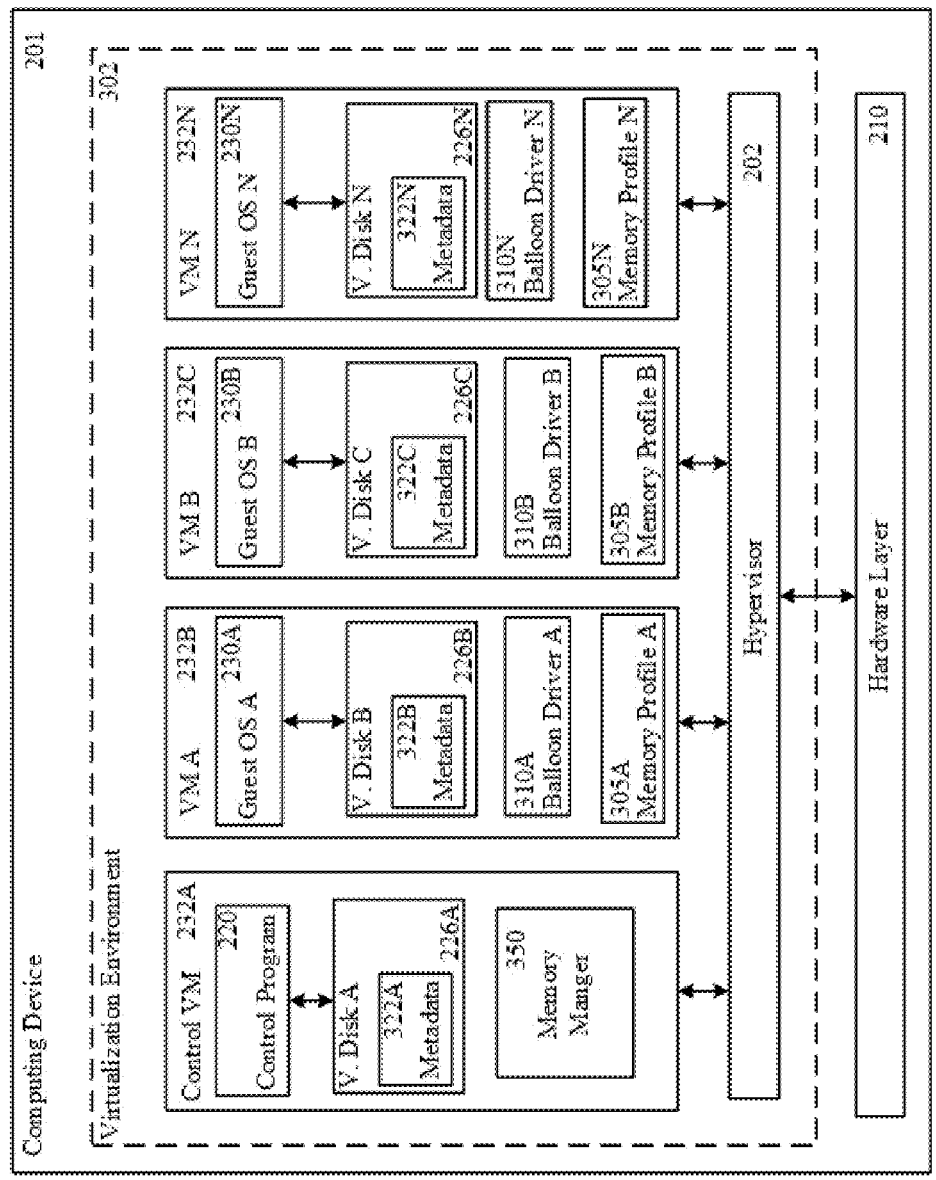
FIG. 3A and FIG. 3B illustrate embodiments of a virtualization environment using a balloon driver and memory profile.

Illustrated in FIG. 3A is one embodiment of a computing device 201 where the control virtual machine 232A can further execute a memory manager 350 that can reallocate memory to virtual machines 232 executing within the virtualization environment 302. Each of the virtual machines 232 can include a memory profile 305A-305N (herein referred to generally as a memory profile 305), and each virtual machine 232 can execute a balloon driver 310A-310N (herein generally referred to as a balloon driver 310.)

Further referring to FIG. 3A, and in more detail, in one embodiment each virtual machine 232 can include a memory profile 305. While FIG. 3A does not illustrate the control virtual machine 232A as having a memory profile 305, in some embodiments the control virtual machine 232A can include a memory profile 305. The memory profile 305, in some embodiments, can be any memory profile 305 that dictates at least a maximum amount of physical memory available to a virtual machine 166 and a minimum amount of physical memory available to a virtual machine 166. In other embodiments, the memory profile 305 can be any memory profile 305 described herein.

The control program 220 can execute a memory manager 350. While FIG. 3A illustrates a memory manager 350 executing within the control virtual machine 232A, in other embodiments the memory manager 350 can execute within the hypervisor 202 or on a remote computer. While the memory manager 350 can execute independent of the control program 220, in some embodiments the memory manager 350 can be a sub-routine or sub-function executing within the control program 220. The memory manager 350, in some embodiments, can manage the allocation of dynamic maximum and minimum memory values, the calculation of target memory values, the allocation and reallocation of memory amongst virtual machines 232 in a virtualization environment 302, and the general management of memory allocation in a virtualization environment 302. In some embodiments, the memory manager 350 can control the inflation and deflation of balloon drivers 310 within the virtual machines 232. In still other embodiments, the memory manager 350 can issue inflation and deflation commands to balloon drivers 310 within the virtual machines 232. The memory manager 350 can execute on a control virtual machine 232A, within the context of a control program 220, within the hypervisor 202 or on a remote computer.

The balloon driver 310, in some embodiments, can be any driver that causes an operating system executing on the computing device 201, the memory manager 350 or the control program 220 to reclaim memory used by the virtual machine(s) 232 executing on the computing device 201. In some embodiments, the balloon driver 310 can be a driver or other application that executes by or in conjunction with the hypervisor 202 or control program 220 to increase the amount of memory used by each virtual machine 232. Increasing the amount of memory used by each virtual machine 232 can include allocating memory pages to one or more virtual machines 232 executing on the computing device 201, where the allocated memory pages correspond to a pinned or locked range of memory addresses on the physical disk(s) 204. By increasing the amount of memory used by each virtual machine 232, the balloon driver effectively reduces the amount of memory available to the operating system executing on the computing device 201 or the control operating system 220. Thus, when the balloon driver 310 continues to allocate memory to the virtual machines, the memory manager 350 or control program 220 responsively reclaims used memory.

When a memory manager 350 of the virtualization environment 302 reclaims memory, in some embodiments the balloon driver 310 can retrieve or otherwise intercept the addresses of the memory pages reclaimed by the balloon driver 310, and forward those page addresses to the control program 220, the memory manager 350 or another application or object executing within the control virtual machine 232. In other embodiments, the balloon driver 310 can forward the page addresses to the hypervisor 202 or a memory manager executing within the hypervisor 202. In some embodiments, the balloon driver 310 can store the reclaimed memory page addresses in a table, database or storage repository in the control virtual machine 232A so that the memory manager 350 can access the memory addresses once the balloon driver 310 deflates. In still other embodiments, the memory manager 350 can enumerate the memory locations (e.g. memory addresses or memory page addresses) of the reclaimed memory. The memory manager 350 can then reallocate memory according to the enumerated memory locations or can store the enumerated memory locations in a table, database or storage repository in the control virtual machine 232A.

A balloon driver 310 can inflate to a predetermined size such that a predetermined amount of memory can be reclaimed. This predetermined size, in some embodiments, can be an amount of memory. For example, the balloon driver 310 can inflate to a size of 10 MB or another memory value amount. In some embodiments, the predetermined size can be determined based on a calculated target memory value. For example, a memory manager 350 can determine a target memory value for a virtual machine 232, e.g. 100 MB. The memory manager 350 can then compare the calculated target memory value to an amount of memory actually used by the virtual machine 232, e.g. compare 100 MB to 90 MB. The difference between the two values can be used to determine the predetermined inflation size, e.g. the predetermined inflation size can be 10 MB. When the balloon driver 310 inflates, the balloon driver 310 can inflate to the predetermined inflation size, e.g. the balloon driver 310 can inflate 10 MB. In other embodiments, the balloon driver 310 can continue to inflate until it reaches a predetermined threshold, or until a process, program or administrator commands the balloon driver 310 to cease inflation. In still other embodiments, the balloon driver 310 can inflate until it reaches a threshold. For example, the balloon driver 310 can inflate until the amount of actual memory used by a virtual machine is substantially equal to a target memory value. Substantially equal can mean that the two numbers are mostly equal but may vary by an acceptable and minor amount or value.

Once the balloon driver reaches either a predetermined threshold or memory value, the balloon driver 310 can deflate by de-allocating the memory pages allocated during inflation. De-allocating the memory pages can include de-allocating those memory pages reclaimed by the memory manager 350. In one embodiment, the memory manager 350 or control program 220 can capture the memory addresses of the memory pages de-allocated during deflation of the balloon driver 310. In other embodiments, the memory manager 350 or control program 220 can retrieve the memory addresses of the reclaimed memory pages from a table, list or other storage repository within the hypervisor layer. The reclaimed memory pages are effectively free or open for use once the balloon driver 310 finishes deflating. Thus, the control program 220, memory manager 350 or hypervisor 202 can allocate memory associated with those reclaimed memory pages to virtual machines 232 executing on the computing device 201.

FIG. 3A illustrates a balloon driver 310 that executes within each virtual machine 232. In some embodiments, the balloon driver 310 can execute within the control virtual machine 232A or within the hypervisor 202 where the balloon driver 310 can execute in conjunction with the hypervisor 202. One or more balloon drivers 310, in some embodiments, can reside or execute within each virtual machine 232 executing on the computing device 201. The control program 220, the memory manager 350 or the hypervisor 202 can communicate with each balloon driver 310 such that the hypervisor 202 can issue instructions to the balloon driver(s) 310 to increase or decrease the size of the "balloon" thereby causing memory reclamation. The memory footprint of each virtual machine 232 can be controlled by issuing instructions to balloon driver(s) 310 within each virtual machine 232.

Figure 3B:
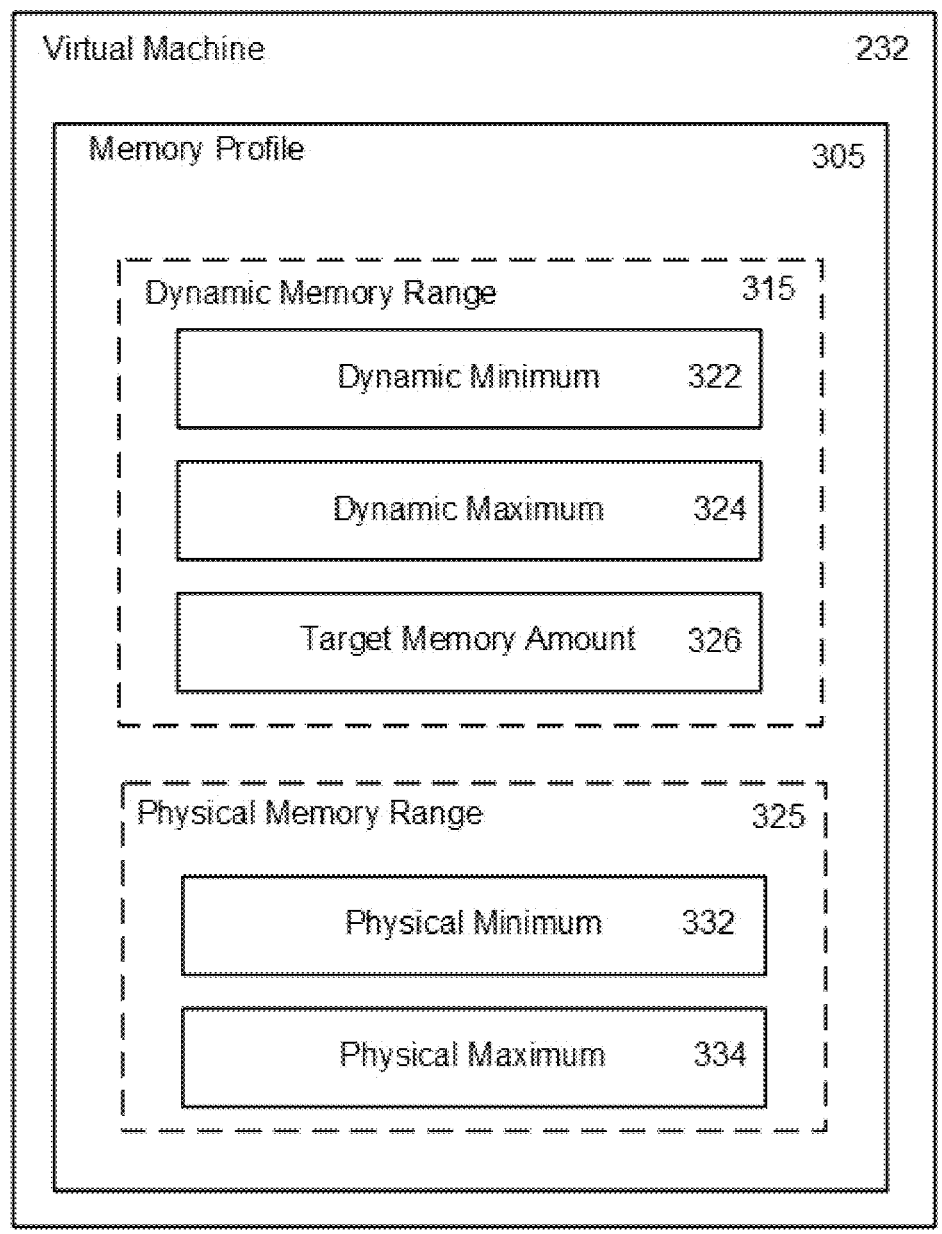

Illustrated in FIG. 3B is one embodiment of virtual machine 232 having a memory profile 305. The memory profile 305, in some embodiments, can include one or more dynamic memory ranges 315 that include each of a dynamic minimum memory value 322, a dynamic maximum memory value 324 and a target memory amount 326. The memory profile 305 can also include a physical memory range 325 that includes a physical minimum memory value 332 and a physical maximum memory value 324.

Further referring to FIG. 3B, and in more detail, in one embodiment each virtual machine 232 executing on a computing device 201 can have a memory profile 305 which can be a configuration setting or can be a profile stored in a control virtual machine 232A. In some embodiments, a memory profile 305 for each virtual machine 232 can be stored in a table or database accessible by the control virtual machine 232A, the control program 220, the memory manager 350 or the hypervisor 202. In other embodiments, the memory profile 305 can be a setting of an interface within the virtual machine 232 used to communicate and interact with the control virtual machine 232A. Still other embodiments include a memory profile 305 that is a text file or other configuration file stored in the file system of a virtual machine 232.

In one embodiment, the physical minimum memory value 332 (i.e. the static minimum memory value) is less than or equal to the dynamic min value 322. The dynamic min value 322, in many embodiments, is less than the dynamic max value 324. The dynamic max value 324, in many embodiments, is less than the physical maximum memory value 334 (i.e. the static maximum memory value.) In some embodiments, the static min 332 and the static max 334 are fixed values that remain fixed during execution of the virtual machine on the computing device 201. In some embodiments, the dynamic max and min 324, 322 can be configured or changed by an administrator, user, program or service at any time. The target memory value 326 can be chosen such that the value is substantially always greater than or equal to the dynamic min 322, and less than or equal to the dynamic max 324.

In one embodiment, the memory profile 350 can include a dynamic memory range 315 that can include a dynamic minimum memory value 322 and a maximum memory value 324. The dynamic minimum and maximum memory values 322, 324 can be chosen based on any of the following criteria: the importance of the virtual machine; a level of importance or criticality assigned to applications and/or processes executing on the virtual machine; an arbitrary risk score determined based on the importance of those processes and/or services executing within the virtual machine; when the virtual machine was created; whether the virtual machine can control the operation of other virtual machines; and any other relevant criteria. In some embodiments, the minimum and maximum values 322, 324 can be based on the physical minimum and maximum memory value 332, 334 such that each value is a percentage of the maximum physical memory value 334. For example, the minimum dynamic memory value 322 can be twenty percent (20%) of the maximum physical memory value 334, while the maximum dynamic memory value 324 can be eighty percent (80%) of the maximum physical memory value 334.

The values chosen for the dynamic minimum and maximum values 322, 324 can, in some embodiments, reflect the importance of a particular virtual machine. For example a first virtual machine that has a dynamic minimum and maximum memory value 322, 324 which is 95% of the actual physical minimum and maximum memory value 332, 324 for that first virtual machine, may be more important than a second virtual machine that has a dynamic minimum and maximum memory value 322, 324 that is 75% of the actual physical minimum and maximum memory value 332, 334 for that second virtual machine. In this example, the first virtual machine may execute more critical or important services and/or applications than the second virtual machine. In some embodiments, the first virtual machine may be designated by the system as the control virtual machine 232A thereby making the first virtual machine more important than the second virtual machine.

In one embodiment, the dynamic maximum and minimum memory values 324, 322 may be percentages of the physical maximum and minimum memory values 334, 332, while in other embodiments the dynamic maximum and minimum memory values 324, 322 can be hard coded values (e.g. minimum=512 megabytes, maximum=1 gigabyte.) In still other embodiments, the dynamic maximum and minimum memory values 324, 322 can be determined on a dynamic basis based on the types and number of applications and/or services executed by the virtual machine. For example, a first virtual machine may have an initial dynamic minimum memory value of 512 megabytes and an initial dynamic maximum memory value of 1 gigabyte. Upon instantiation of the first virtual machine, a critical application requiring a large amount of resources begins executing on the first virtual machine. The control virtual machine 232A, the control program 220 or the memory manager 350 can then, in some embodiments, modify the dynamic maximum memory value of the first virtual machine from 1 gigabyte to 10 gigabytes, and the dynamic minimum memory value of the first virtual machine from 512 megabytes to 1 gigabyte.

The target memory amount 326 can in some embodiments be a memory value determined by analyzing the maximum and minimum dynamic memory values. In some embodiments, the target memory amount 326 can be a number that is between the value range between the maximum and minimum values. Thus, the target memory amount 326 can be determined using the following equation, $$[\text{Min Dynamic Mem.}] + ([\text{Max Dynamic Mem.}] - [\text{Min Dynamic Mem.}])/2$$

where the Min Dynamic Mem. value is the minimum dynamic memory value 322 and the Max Dynamic Mem. is the maximum dynamic memory value 324. In some embodiments the target memory amount 326 can be calculated each time memory is reclaimed from a virtual machine or allocated to a virtual machine. In other embodiments, the target memory amount 326 can be stored in a table, configuration file or other repository along with the dynamic minimum and maximum memory values 322, 324. This table, configuration file or other repository can reside within each virtual machine 232, within the control virtual machine 232A, or within a location accessible by the memory manager 350 and/or the control program 220. When the dynamic minimum and maximum memory values 322, 324 are altered, a stored target memory amount 326 can also be recalculated and altered.

The target memory amount or value, in some embodiments, can be calculated using a host compression ratio. The host compression ratio can represent the memory constraints of a particular virtual machine and can be calculated by the control program 220 or another application anytime a virtual machine or domain is created or destroyed, or anytime a dynamic memory value or dynamic memory constraint is changed. A dynamic memory constraint can be a range of memory values used to quantify a threshold that, when crossed, can cause severe performance degradation. A target memory value can be calculated using the host compression ratio, for example the target memory value can be calculated using the following equation:

$$(\text{Host Compression Ratio})(\text{Min Dynamic Mem.}) + (1 - \text{Host Compression Ratio})(\text{Max Dynamic Mem.})$$

While in many embodiments the target memory amount 326 can be a value calculated according to the above-mentioned equation, in other embodiments the target memory amount 326 can be any memory value within the range of memory values between the minimum and maximum memory values. In one embodiment this range can be dictated by the dynamic maximum and minimum memory values 324, 322, while in other embodiments this range can be dictated by the physical maximum and minimum memory values 332, 334.

In some embodiments, the memory profile 305 can include a physical memory range 325 that corresponds to the actual physical minimum memory value 332 and physical maximum memory value 334 of the physical disk(s) 228. These values, in many embodiments, are dictated by the memory included in the computing device 201, while in other embodiments these values can include memory within the computing device 201 as well as virtual memory and remote memory storages accessible and available to the computing device 201. While FIG. 3B illustrates a memory profile 305 that includes a physical memory range 325 characterized by the actual physical memory max and min of the computing device 201, in other embodiments the memory profile may not include a physical memory range 325. In these embodiments, the physical minimum and maximum memory values can be intuited or otherwise determined by querying a control operating system 220 that controls the physical memory available to virtual machines executing in a virtualization environment. In most embodiments, the physical minimum memory value 332 and the maximum memory value 334 are static memory values which cannot change unless the physical memory available to the computing device 201 changes.

In some embodiments, the memory profile 305 for a virtual machine 232 can be altered or configured using an application programming interface provided by the control program 220 or the hypervisor 202. While in some embodiments any aspect of the memory profile 305 can be altered, in other embodiments the physical memory range 325 cannot be altered. In some embodiments, when a static memory constraint in the memory profile 305 is altered, the change takes effect when the virtual machine 232 is rebooted. In other embodiments, when a dynamic memory constraint in the memory profile 305 is altered, the change takes effect substantially immediately. In some embodiments, the memory profile 305 can have a proportional mode within which the control program 220 or memory manager 350 can automatically assign a target memory amount 326 based on the dynamic minimum memory value 322 and the dynamic maximum memory value 324. The control program 220 or the memory manager 350, in some embodiments, can communicate any aspect of the memory profile, e.g. the target memory amount 326, to the balloon drivers 310.

In some embodiments, when a virtual machine is started, the memory manager 350 or control program 220 can configure the memory profile 305 for each virtual machine 232. For example, the memory manager 350 or control program 220 can calculate a host compression ratio for each virtual machine 232 and can use that compression ratio to determine a target memory amount 326 for each virtual machine 232. Upon determining the target memory amount 326, the memory manager 350 or control program 220 can assign the target amounts 326 to each virtual machine 232. In some embodiments, these target amounts 326 can represent a minimized or reduced target amount 326. Thus, when the virtual machine 232 boots, the memory manager 350 can cause the balloon drivers 310 to inflate. Upon inflation, the memory manager 350 can check to see if the reduced target amount 326 was acquired. In situations where this amount 326 was acquired, the memory manager 350 can do nothing. In situations where this amount 326 was not acquired, the memory manager 350 can signal a failure and can reset the target memory amount 326 to the previous target memory amount 326.

Figure 4:
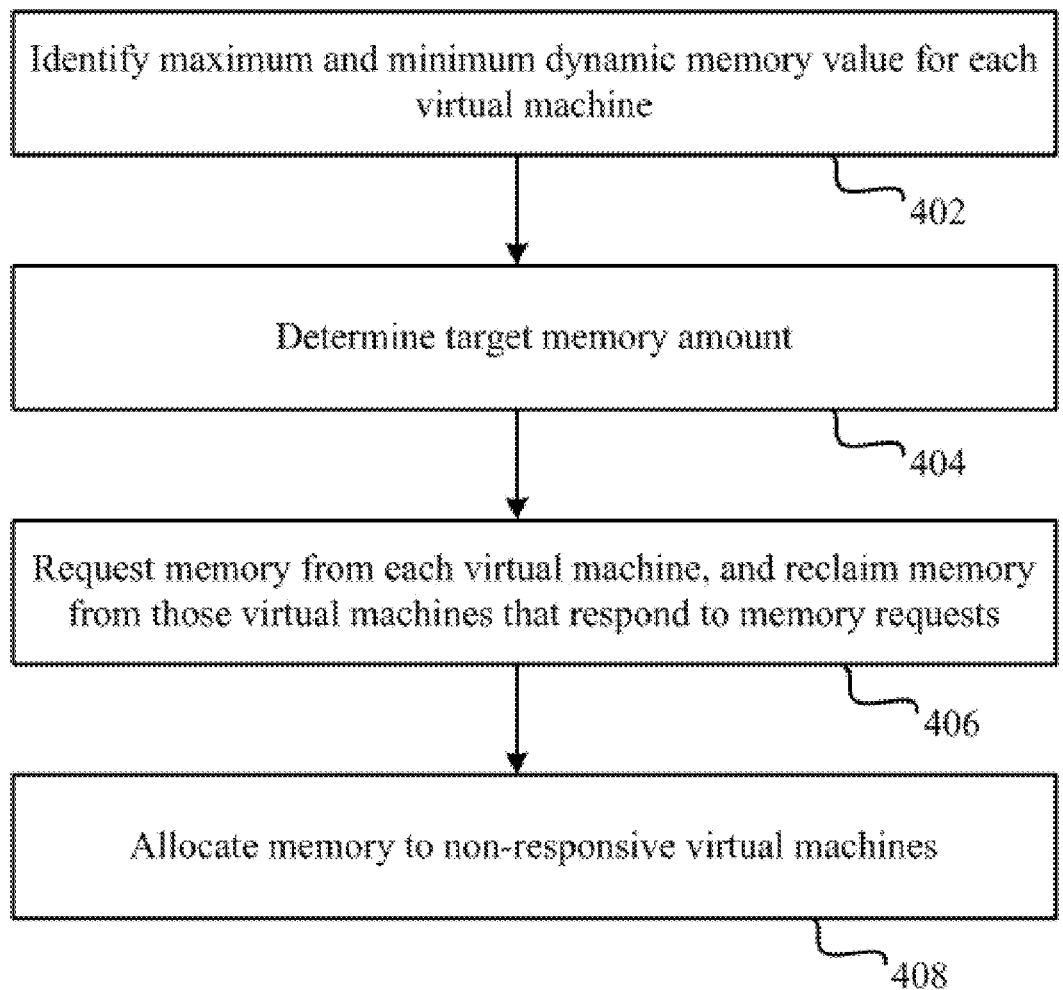
FIG. 4 illustrates an embodiment of a method for dynamic memory control.

Illustrated in FIG. 4 is an embodiment of a method for reallocating and reclaiming memory from virtual machines executing in a virtualization environment. In one instance a memory manager 350 can identify the dynamic maximum and minimum memory values 322, 324 associated with substantially each virtual machine 232 executing within the virtualization environment (Step 402), and can further calculate or determine a target memory amount 326 associated with each virtual machine 232 (Step 404). Upon identifying these values, the memory manager 350 can then instruct a balloon driver 310 within the virtualization environment to inflate which can then cause the memory manager 350, the control virtual machine 232A or a control program 220 to reclaim a predetermined number of memory pages (e.g. amount of memory) from one or more virtual machines. In some embodiments, the memory manager 350 can request memory from each virtual machine during the reclamation process and can then reclaim memory from those virtual machines that respond to the memory manager's request (Step 406). The memory manager 350 can then instruct the balloon driver to deflate, obtain the memory addresses of those memory pages reclaimed during the inflation process and allocate the reclaimed memory pages to those virtual machines that did not respond to the memory manager's request (Step 408).

Further referring to FIG. 4, and in more detail, any one of the steps of the process can be carried out by a memory manager 350, a control program 220, the control virtual machine 232A or any combination thereof. In other embodiments, at least a portion of the process can be carried out by the hypervisor 202.

In some embodiments, the memory manager 350 can obtain the dynamic minimum and maximum memory values as well as the physical minimum and maximum memory values 332, 334 (Step 402). In some embodiments, the memory manager 350 can identify the maximum and minimum memory values, e.g. the dynamic and physical maximum and minimum values, in response to detecting a virtual machine event. This virtual machine event can be any event while in some embodiments the event can be a reboot of a virtual machine 232, a start of a virtual machine, or a change made to a dynamic constraint such as the dynamic maximum and minimum memory values or the target memory value. In one embodiment, the memory manager 350 can obtain the maximum and minimum memory values for each virtual machine 232 within the virtualization environment. In this embodiment, the memory manager 350 can further determine or calculate a target memory value 326 for each virtual machine 232 within the virtualization environment using the obtained or identified maximum and minimum memory values.

Upon determining each of the dynamic and physical max and min memory values, the memory manager 350 can then determine the target memory amount 326 for each virtual machine 232 and can further determine whether the actual memory available to a particular virtual machine 232 is greater than, less than or equal to the determined maximum and minimum memory values (Step 404). In some embodiments, when the memory manager 350 determines that the actual memory allocated to or used by a particular virtual machine is less than the target memory amount 326 of that particular virtual machine, the memory manager 350 can allocate additional memory to that virtual machine. Conversely, when the memory manager 350 determines that the actual memory allocated to or used by a particular virtual machine is greater than the target memory amount 326 for that virtual machine, the memory manager 350 can reclaim additional memory from that virtual machine. In some embodiments, the memory manager 350 can identify at least one virtual machine 232 that has an actual memory usage value less than the target memory value or amount 326 assigned to that virtual machine. The actual memory usage value can be the amount of memory actually used by the virtual machine 232. In these embodiments, the memory manager 350 can allocate additional memory to the virtual machine 232, de-allocate the additional memory, and reallocate the additional memory to another virtual machine 232.

Allocating additional memory to a virtual machine 232 can be accomplished by inflating a balloon driver 310 in that virtual machine 232. Inflation of a balloon driver 310 causes the control program 220 or a memory manager resident in the control virtual machine 232A or the hypervisor 202 to allocate memory page tables or memory addresses to the virtual machine 232 executing the balloon driver 310. This allocated memory is assigned to the virtual machine 232 such that the memory is no longer available to other virtual machines executing within the virtualization environment. Memory can be allocated to a virtual machine 232 until the amount of actual memory used by the virtual machine 232 substantially equals the target memory value 326 for that virtual machine. In some embodiments, substantially equal can mean that the actual memory usage value equals the target memory value 326 or is a value substantially close to the target memory value 326.

Upon inflation of the balloon driver 310, the memory manager 350 can track or otherwise store the memory addresses of the memory pages allocated to the virtual machine 232. The memory manager 350, in some embodiments, can enumerate the memory locations, addresses or page table addresses of the allocated memory after the target memory value 326 is reached or after the additional memory is de-allocated from the virtual machine 232. In some embodiments, the memory manager 350 can execute in conjunction with the memory management module to reclaim memory from those virtual machines identified as having an actual memory usage value greater than the target memory value 326 for those virtual machines (Step 406). In other embodiments, the memory manager 350 can merely track an amount of memory reclaimed from each virtual machine.

In some embodiments, once the target memory value 326 for the virtual machine is reached, the memory manager 350 can de-allocate the additional memory from the virtual machine 232 by deflating the balloon driver 310. In some embodiments, de-allocation of memory occurs once the memory manager 350 has allocated enough memory to a virtual machine 232, or once the balloon driver 310 inflates enough, so that the actual amount of memory used by the virtual machine 232 equals the target memory value 326 for that virtual machine 232. Once the balloon driver 310 deflates, the memory manager 350 can then go back and re-allocate memory to those virtual machines that have an actual memory usage value less than the target memory value 326 for those virtual machines, while purposefully not re-allocating memory to those virtual machine that have an actual, allocated memory value greater than the target memory value 326. In some instances, the memory allocated to the virtual machine 232 can be reallocated to another virtual machine 232 once the balloon driver 310 deflates and the additional memory is de-allocated. Reallocating the memory can include reallocating the enumerated memory addresses or locations to another virtual machine 232. In other embodiments, reallocating the memory can include reallocating an amount of memory equal to the amount of de-allocated memory to another virtual machine 232. While FIG. 4 illustrates a method where memory is requested from each virtual machine, in some embodiments the method may not include this step, e.g. Step 406.

The memory manager 350, in some embodiments, can allocate memory reclaimed during the balloon driver 310 inflation/deflation process to those virtual machines from which the balloon driver 310 was unable to reclaim memory (Step 408). Thus, the memory manager 350 can track from which virtual machines 232 memory was reclaimed and from which virtual machines 232 the memory manager 350 was unable to reclaim memory. As stated above, the memory manager 350 can allocate reclaimed memory to non-responsive virtual machines from which the memory manager 350 was unable to reclaim memory.

In some embodiments, the memory manager 350 can allocate memory to virtual machines subsequent to the balloon driver 310 inflation/deflation process and without regard to which virtual machines were responsive to the memory manager's 350 request for memory. In these embodiments, the memory manager 350 can evaluate each virtual machine 232 subsequent to the balloon driver's inflation/deflation process to determine which virtual machines require additional memory and which virtual machines do not require additional memory. Virtual machines are identified as requiring additional memory when their actual memory usage is below the target memory amount 326 for those virtual machines. Virtual machines are identified as not requiring additional memory when their actual memory usage is greater than or equal to the target memory amount 326 for those virtual machines.

The memory manager 350, in some embodiments, can rank virtual machines according to their memory requirements. Thus, those virtual machines identified as requiring a large amount of additional memory resources may receive additional memory reclaimed during the balloon driver 310 inflation/deflation process first and before other virtual machines identified as requiring a lesser amount of additional memory resources. In some embodiments, the memory manager 350 can take into account whether a particular virtual machine has been identified as a priority or mission-critical virtual machine and may allocate memory to that virtual machine first and regardless of whether other virtual machines require a greater amount of memory.

The method illustrated in FIG. 4 can execute spontaneously and may be triggered by any of the following events: a page fault; a determination that the actual memory allocated to a particular virtual machine has fallen below the target memory amount 326 for that virtual machine; or any other similar event. In some embodiments, the method can execute each time a virtual machine boots or each time the computing device 201 boots. In other embodiments, the method can execute anytime there is a virtual machine event. In still other embodiments, the method can execute anytime there is a dynamic constraint modification, e.g. a modification of a dynamic memory range or target memory value.

Example 1

The actions carried out in this example can be carried out by a control virtual machine 232A, a control program 220, a memory manager 350, a hypervisor 202, or any other platform or application that can manage memory allocation and disk partitioning.

In one embodiment, the control program 220, hypervisor 202 or memory manager 350 can dynamically re-partition physical memory, e.g. physical disk(s) 204, in response to any number of virtual machine events. The virtual machine events, in some embodiments, can include the creation, reboot and stopping of virtual machines. When a virtual machine is started, memory can be de-allocated from those virtual machines already executing on the computer 201, and re-allocated to the newly started virtual machine. When a virtual machine is stopped, memory can be re-allocated to those virtual machines still executing on the computer 201.

In some embodiments, the hypervisor 202 can automatically decrease the amount of memory available to those virtual machines already executing on a computer 201 in response to an increase in the number of virtual machines executing on the computer 201. In other embodiments, the hypervisor 202 can automatically increase the amount of memory available to those virtual machines executing on a computer 201 in response to a decrease in the number of virtual machines executing on the computer 201. The control program 220 or memory manager 350, in other embodiments can maintain the memory allocation targets for all virtual machines at a substantially similar distance from the dynamic max 324 to the dynamic min 322, while maintaining a high target memory value 326. In these embodiments, the substantially similar distance can be referred to as a compression ratio. Other embodiments include maintaining memory allocation targets for all virtual machines in a pool at around the same proportional distance from the dynamic min 322 to the dynamic max 324.

The control program 220, memory manager 350 or the control virtual machine 232A can respond to the instantiation of a new virtual machine by dynamically reducing the amount of memory allocated to virtual machines executing on the computer 201. This response can be achieved by entering an iterative memory de-allocation cycle whenever a new virtual machine is started on a computer 201 that does not have available memory to allocate to the new virtual machine. This iterative memory de-allocation cycle progressively removes memory from virtual machines that respond to a memory de-allocation request. The cycle, in many embodiments, can execute until enough memory is reclaimed for the new virtual machine. The hypervisor 202 can then rebalance the target memory values 326 for each virtual machine subsequent to successfully starting the new virtual machine.

In some embodiments, the hypervisor 202 can start each new virtual machine with a minimum projected compression ratio, where the compression ratio is defined as a relative distance from dynamic max 324 to dynamic min 322:

$$\text{compression ratio} = (\text{dynamic max} - \text{target})/(\text{dynamic max} - \text{dynamic min})$$

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for dynamically reallocating memory amongst virtual machines executing within a virtualization environment, the method comprising:
   identifying, by a memory manager executing on a computer, a maximum memory value and a minimum memory value for each virtual machine executing within a virtualization environment of the computer;
   calculating, by the memory manager, a host compression ratio;
   determining, by the memory manager using the identified maximum memory value, minimum memory value and the host compression ratio, a target memory value for each virtual machine of the virtualization environment, wherein the target value is the sum of the product of the host compression ratio and the minimum memory value and the product of the inverse of the host compression ratio and the maximum memo value;
   maintaining, by the memory manager, the target memory value for each virtual machine of the virtualization environment, identifying, by the memory manager, at least one virtual machine having an actual memory usage value less than the target memory value for the at least one virtual machine;

allocating, by the memory manager responsive to identifying the at least one virtual machine, additional memory to the at least one virtual machine by inflating a balloon driver;

de-allocating, by the memory manager responsive to allocating the additional memory, the additional memory from the at least one virtual machine by deflating the balloon driver; and reallocating, responsive to de-allocating the additional memory, the de-allocated memory to another virtual machine executing within the virtualization environment.

2. The method of claim 1, wherein identifying the maximum and minimum memory value further comprises identifying a maximum physical memory value and a minimum physical memory value for each virtual machine.

3. The method of claim 1, wherein identifying the maximum and minimum memory value further comprises identifying a maximum dynamic memory value and a minimum dynamic memory value for each virtual machine.

4. The method of claim 1, wherein allocating the additional memory further comprises allocating additional memory until the actual memory usage value of the at least one virtual machine substantially equals the target memory value for the at least one virtual machine.

5. The method of claim 4, wherein de-allocating the additional memory further comprises de-allocating the additional memory upon determining the actual memory usage value of the at least one virtual machine substantially equals the target memory value for the at least one virtual machine.

6. The method of claim 1, further comprising enumerating, by the memory manager responsive to de-allocating the additional memory, memory locations of the de-allocated memory.

7. The method of claim 6, wherein reallocating the de-allocated memory further comprises reallocating the enumerated memory locations to another virtual machine.

8. The method of claim 1, further comprising identifying a second virtual machine having an actual memory usage value greater than the target memory value for the second virtual machine.

9. The method of claim 8, further comprising reclaiming an amount of memory from the second virtual machine, and reallocating the reclaimed memory to another virtual machine executing within the virtualization environment.

10. The method of claim 1, wherein identifying the maximum and minimum memory values further comprises identifying a maximum memory value and a minimum memory value for each virtual machine responsive to detecting a virtual machine event.

11. The method of claim 10, wherein detecting a virtual machine event further comprises detecting any of the following virtual machine events: a virtual machine reboot, a virtual machine start, and a dynamic constraint modification.

12. A system for dynamically reallocating memory amongst virtual machines executing within a virtualization environment, the system comprising:

a computer executing a virtualization environment comprising virtual machines; and a memory manager executing on the computer to:

identify a maximum memory value and a minimum memory value for each virtual machine of the virtualization environment, calculate a host compression ratio, determine, using the identified maximum memory value, the identified minimum memory value and the host compression ratio, a target memory value for each virtual machine of the virtualization environment, wherein the target value is the sum of the product of the host compression ratio and the minimum memory value and the product of the inverse of the host compression ratio and the maximum memory value, maintain the target memory value for each virtual machine of the virtualization environment, identify, at least one virtual machine having an actual memory usage value less than the target memory value for the at least one virtual machine, allocate, responsive to identifying the at least one virtual machine, additional memory to the at least one virtual machine by inflating a balloon driver, de-allocate, responsive to allocating the additional memory, the additional memory from the at least one virtual machine by deflating the balloon driver, and reallocate, responsive to de-allocating the additional memory, the de-allocated memory to another virtual machine executing within the virtualization environment.

13. The system of claim 12, wherein the maximum and minimum memory value further comprise a maximum physical memory value and a minimum physical memory value.

14. The system of claim 12, wherein the maximum and minimum memory value further comprise a maximum dynamic memory value and a minimum dynamic memory value.

15. The system of claim 12, wherein the memory manager allocates additional memory until the actual memory usage value of the at least one virtual machine substantially equals the target memory value for the at least one virtual machine.

16. The system of claim 15, wherein the memory manager de-allocates the additional memory upon determining the actual memory usage value of the at least one virtual machine substantially equals the target memory value for the at least one virtual machine.

17. The system of claim 12, wherein the memory manager enumerates memory locations of the de-allocated memory responsive to de-allocating the additional memory.

18. The system of claim 17, wherein the memory manager reallocates the enumerated memory locations to another virtual machine.

19. The system of claim 12, wherein the memory manager identifies a second virtual machine having an actual memory usage value greater than the target memory value for the second virtual machine.

20. The system of claim 19, wherein the memory manager reclaims an amount of memory from the second virtual machine, and reallocates the reclaimed memory to another virtual machine executing within the virtualization environment.

21. The system of claim 12, wherein the memory manager identifies the maximum and minimum memory values responsive to detecting a virtual machine event.

22. The system of claim 21, wherein a virtual machine event comprises anyone of a virtual machine reboot, a virtual machine start, and a dynamic constraint modification.

23. The method of claim 1, wherein the host compression ratio is calculated by a control program.

24. The system of claim 12, wherein the host compression ratio is calculated by a control program.

* * * * *